United States Patent [19]

Painter et al.

[11] 4,274,187

[45] Jun. 23, 1981

[54] SPRING INSTALLATION TOOL FOR ARTICLE LOADING MACHINE

[75] Inventors: P. Eric Painter, Stow; Curtis P. Fisher, Cuyahoga Falls, both of Ohio

[73] Assignee: A-T-O, Inc., Willoughby, Ohio

[21] Appl. No.: 50,181

[22] Filed: Jun. 20, 1979

[51] Int. Cl.[3] .......... B23P 19/04
[52] U.S. Cl. .......... 29/225; 29/235
[58] Field of Search .......... 29/225, 229, 235, 280; 53/592, 585, 295

[56] References Cited

U.S. PATENT DOCUMENTS

| | | | |
|---|---|---|---|
| 3,030,700 | 4/1962 | Jensen | 29/229 |
| 3,263,318 | 8/1966 | Merrill | 29/235 |
| 3,604,096 | 9/1971 | Shiroma | 29/235 |

FOREIGN PATENT DOCUMENTS

| | | | |
|---|---|---|---|
| 595112 | 5/1976 | U.S.S.R. | 29/235 |

*Primary Examiner*—James L. Jones, Jr.
*Attorney, Agent, or Firm*—Oldham, Oldham, Hudak & Weber Co.

[57] ABSTRACT

A spring installation tool for article loading machines is provided to facilitate the application of a biasing spring to sets of guide fingers. Fundamentally, the invention includes an elongated frame member having a tubular portion at a first end thereof for receiving the biasing spring. A rod is provided having a ring at one end which encompasses the tubular portion while being maintained in spring-biased engagement at an opposite end thereof with a second end of the frame member. The rod is operative for reciprocating movement with respect to the frame member to effectuate forcing of the biasing spring from the tubular portion. In use, the tubular portion, bearing a biasing spring, is placed over the end section of a set of guide fingers and the rod is reciprocated to force the spring from the tubular portion into securing and biasing engagement with the fingers.

7 Claims, 4 Drawing Figures

SPRING INSTALLATION TOOL FOR ARTICLE LOADING MACHINE

BACKGROUND OF THE INVENTION

The invention presented hereinafter resides in the art of article loading machines, and particularly for tools facilitating repairs to a loading grid. More specifically, the instant invention relates to a spring installation tool for an article loading machine of the nature presented in U.S. Pat. No. 3,788,034, and manufactured by Hartness International, Inc., of Greenville, S.C.

The grid recited directly above is shown in the prior art drawing of FIG. 1, wherein the case packer grid is designated generally by the numeral 10. This device includes a plurality of sets of guide fingers 12, of plastic construction, which are utilized for opening cartons for receiving bottles or other containers, and for guiding such bottles or containers into the proper carton positions. The sets of guide fingers 12 depend from a frame 14 which has mounted thereabove a plurality of grid plates 16. These plates operate as lane guides for receiving and channeling the bottles or other containers for proper positioning above the receiving carton.

With reference to FIG. 2, it can be seen that the sets of fingers 12 comprise, in this prior art embodiment, four fingers 18, two such fingers on each side of a mounting plate 20. A keeper ring 22 is received within a common groove about the fingers 18 in a set 12 and passes through a slot within the mounting plate 20 at spaced intervals therealong. The ring 22 provides a pivot point for each of the fingers 18 of a set 12, the finger being urged inwardly toward the center of the set when a bottle or other container passes thereagainst. It will be understood that such a container will pass through the area defined by four sets 12, riding against one finger 18 of each set. When the container contacts the fingers 18, the fingers are urged inwardly about the pivot point defined by the ring 22, and against the biasing of a bias spring 28 maintained about a groove 26. The groove 26 in each of the fingers 18 is a slight distance, approximately one-half inch, below the top rounded edges 24 of the fingers. This groove is maintained above the mounting plate 20 such that the spring 28 maintained therein may be operative for returning each of the fingers 18 to a normal or quiescent position following the depositing of a bottle or other container.

It should also be noted that a spacer 29, having an approximate thickness equivalent to that of the plate 20, is received over the plate 20 and between fingers 18 maintained on the same side of the plate. Thus, the combination of the spacer 29 and the plate 120 maintains each of the fingers 18 in a symmetrically spaced relationship with respect to each other and facilitates the pivoting of the fingers 18 about the ring 22.

With the fingers 18 being of plastic construction, and with the spring 28 being repeatedly flexed and maintained only by the groove 26, it is not uncommon for a finger 18 to break, or a spring 28 to become disengaged from its groove. In either situation, it is necessary to replace the biasing spring 28 such that normal operation of the case packer grid may be achieved. Unfortunately, the grid plates or lane guides 16 make it virtually impossible to gain access to the top ends 24 of the fingers 18. Consequently, replacement of a finger 18 or a spring 28 has, in the past, required removal of at least certain of the grid plates 16 to gain access to the tops of the fingers 18. Such removal and replacement of the grid plates results in a significant amount of down time for the packer and a consequent loss of production.

OBJECTS OF THE INVENTION

In light of the foregoing, it is an object of the instant invention to provide a spring installation tool for article loading machines which allows one to gain access to the rounded top end portion of the grid guide fingers without dismantling the machine.

Another object of the invention is to present a spring installation tool for article loading machines which may be easily used by a single operator to effectuate replacement or installation of a spring about the upper end of the fingers comprising a set.

Still another object of the invention is to provide a spring installation tool for an article loading machine which is adapted to be self-centering with respect to the ends of the fingers comprising a set and which is capable of aligning and securedly engaging ends of the fingers to facilitate application of a biasing spring.

Yet an additional object of the invention is to provide a spring installation tool for an article loading machine which is inexpensive and simplistic to construct, while being durable and reliable in use.

SUMMARY OF THE INVENTION

The foregoing and other objects of the invention which will become apparent as the detailed description proceeds are achieved by a tool for installing a spring on an article loading machine, comprising: a frame member; a spring receiving means connected to a first end of said frame member for receiving a spring thereon; and reciprocating means interconnected with said frame means between a second end thereof and said first end for removing the spring from said spring receiving means.

DESCRIPTION OF THE DRAWING

For a complete understanding of the objects, techniques, and structure of the invention, reference should be had to the following detailed description and accompanying drawing wherein.

DETAILED DESCRIPTION OF PREFERRED EMBODIMENT

Figure 1:
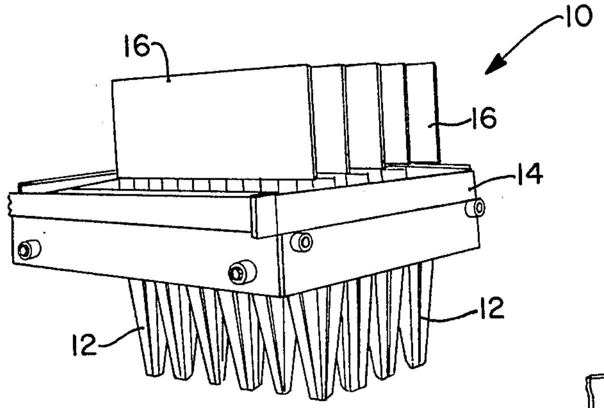
FIG - 1 PRIOR ART
FIG. 1 is a pictorial view of the case packer grid assembly of the prior art.
Figure 2:
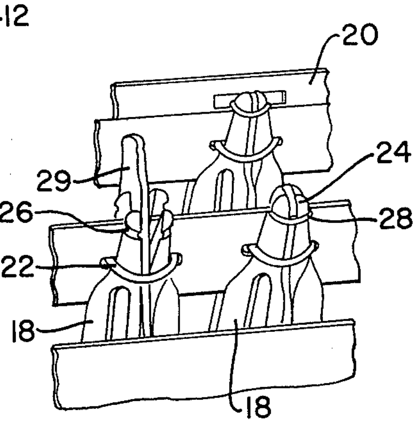
FIG - 2 PRIOR ART
FIG. 2 is a top pictorial view of the case packer grid of FIG. 1 with the grid plates or lane guides removed.
Figure 3:
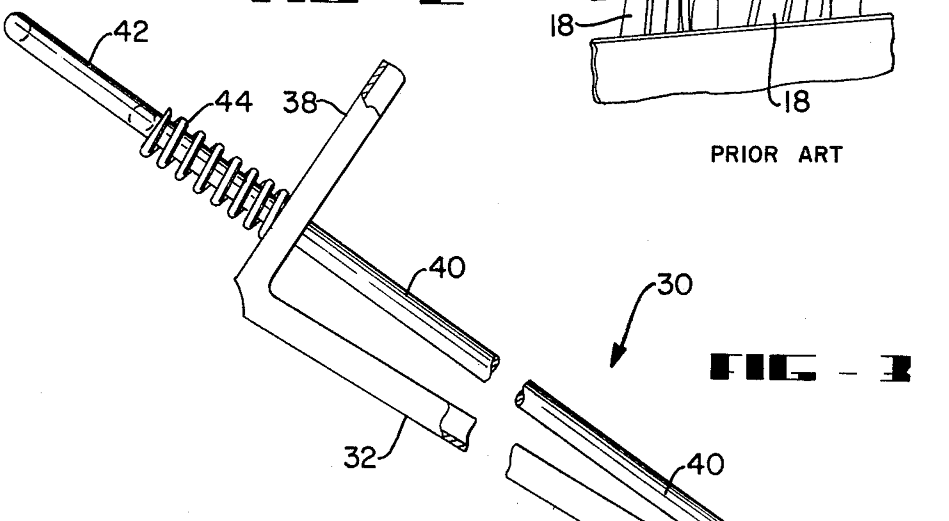
FIG. 3 is a side elevational view of the spring installation tool for an article loading machine comprising the instant invention.
Figure 3:
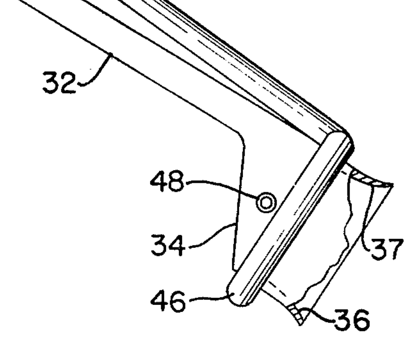
Figure 4:
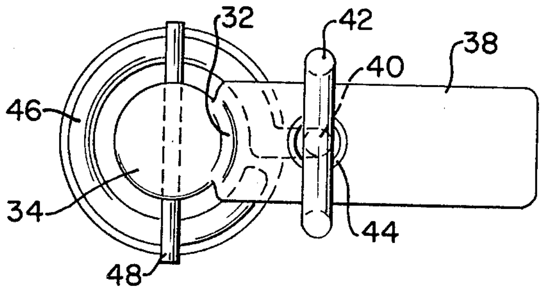
FIG. 4 is a top view of the tool shown in FIG. 3.

Referring now to FIGS. 3 and 4, it can be seen that the spring installation tool of the instant invention is designated generally by the numeral 30. This tool includes a frame member 32 of a length which is preferably slightly greater than the height of the grid plates 16 above the frame 14. The frame member 32 may be of any suitable construction, with the preferred embodiment comprising an elongated metal or plastic member of rectangular cross-section. Affixed to an end of the frame member 32 is a tubular portion 34. The portion 34 may be characterized by a flared lip 36 thereabout, and by a bore 37 which angles inwardly toward the centerline such that the inside geometry of the tubular portion 34 has the appearance of a truncated cone.

A handle 38 is bent from, or otherwise affixed to, the frame member 32 at an end opposite that maintaining the tubular portion 34. Passing through a hole within the handle 38 is a push rod 40 which has a thumb ring 42 formed at one end thereof. A biasing spring 44 is maintained between the handle 38 and the thumb ring 42. At the opposite end of the push rod 40 is a ring 46 which encompasses the cylindrical member 34. The spring biases the push rod 49 by interengagement between the handle 38 and thumb ring 42 to bring the ring 46 into contacting engagement with the stop 48. This stop may be nothing more than a pin or other means driven through or extending from the outer surface of the cylindrical portion 34. An operator may thus reciprocate the rod 49 and ring 46 between the flared lip 36 and the stop 48 upon the tubular portion 34.

In use, the operator may secure the tool 30 with his thumb in the thumb ring 42 and his index finger beneath the handle 38. A biasing spring 28, of a ring-like nature, may be placed over the flared lip 36 and maintained upon the tubular portion 34 between such lip and the ring 46. In the case of a broken finger 18, the same may be withdrawn by the operator from beneath the frame 14 and replaced in like manner. Then, by holding the four fingers comprising a set 12 together with one hand beneath the frame 14, the truncated conical bore 37 may be slid down upon the rounded top edges 24 of such fingers, aligning the grooves 26 thereof. It will be appreciated that the angle of the bore 37 is such that when the rounded top edges 24 are received within the bore 37, the grooves 26 lie immediately below the flared lip 36. At this point in time, the operator merely presses his thumb in the thumb ring 42 toward his index finger beneath the handle 38, pushing the ring 46 toward the flared lip 36. The biasing spring 28 then slides off the lip 36 and is received within the grooves 26 of the fingers 18. The biasing spring 28 is then in proper operative position with respect to all of the fingers of the set.

It will be understood that removal of the spring 28 from the groove 26 of a broken finger 18 may be easily achieved utilizing any appropriate elongated member, preferably having a hooked portion at an end thereof.

Thus, it can be seen that the objects of the invention have been achieved by the structure presented hereinabove. It will further be understood that the tool 30 may be constructed of any suitable material such as metal, plastic, or the like to achieve the objects of the invention. It will further be appreciated that certain modifications and alterations of the preferred embodiment of the invention may be made without departing from the basic theme thereof. Consequently, while only the best mode and preferred embodiment of the invention has been presented and described in detail, it is to be understood that the true scope and breadth of the invention is set forth in the appended claims.

What is claimed is:

1. A tool for installing a spring on an article loading machine, comprising:

a frame member;

a spring receiving means connected to a first end of said frame member for receiving a spring thereon, said spring receiving means having a tapered bore passing therethrough and a flared lip about an end circumference thereof; and reciprocating means interconnected with said frame means between a second end thereof and said first end for removing the spring from said spring receiving means.

2. The tool according to claim 1 wherein said reciprocating means comprises a rod passing through said frame member at said second end thereof and substantially encircling said spring receiving means at said first end thereof.

3. The tool according to claim 2 which further includes a spring interposed between said rod and said frame member at said second end and wherein said spring receiving means includes a stop making contacting engagement with said rod.

4. A tool for installing a spring about a top groove of fingers comprising a set of fingers in an article loading machine, comprising:

a frame having first and second ends;

a handle at said first end;

spring receiving means at said second end for receiving the spring thereon, said means having a tapered outer surface and bore passing axially therethrough; and a push rod reciprocatingly maintained between said handle and said spring receiving means and wherein said rod passes through a hole in said handle, said rod having a first ring formed at an end thereof and which includes a spring interposed between said first ring and said handle and said push rod having spring engaging means at the other end thereof adjacent said spring receiving means for removing the spring from said spring receiving means.

5. The tool as recited in claim 4 wherein said rod includes a second ring at another end thereof, said ring encompassing said spring receiving means.

6. The tool as recited in claim 4 wherein said spring receiving means is externally substantially cylindrical, being flared at one end thereof.

7. The tool as recited in claim 5 wherein said bore within said spring means is geometrically a truncated cone.

* * * * *